(12) United States Patent
Dunford et al.

(10) Patent No.: US 9,573,187 B2
(45) Date of Patent: Feb. 21, 2017

(54) BLIND, BULBING, TACKING RIVET AND METHOD OF INSTALLATION

(71) Applicant: SPS Technologies, LLC, Jenkintown, PA (US)

(72) Inventors: Alyssa Dunford, Irvine, CA (US); Caleb Lemler, Santa Ana, CA (US); Rachel Bethancourt, Santa Ana, CA (US)

(73) Assignee: SPS TECHNOLOGIES, LLC, Jenkintown, PA (US)

( * ) Notice: Subject to any disclaimer, the term of this patent is extended or adjusted under 35 U.S.C. 154(b) by 359 days.

(21) Appl. No.: 14/483,792

(22) Filed: Sep. 11, 2014

(65) Prior Publication Data

US 2014/0377030 A1     Dec. 25, 2014

Related U.S. Application Data

(63) Continuation-in-part of application No. 14/215,544, filed on Mar. 17, 2014, now Pat. No. 9,051,954.

(Continued)

(51) Int. Cl.
    *F16B 13/04*      (2006.01)
    *B21J 15/04*      (2006.01)
    *F16B 19/10*      (2006.01)

(52) U.S. Cl.
CPC ............ *B21J 15/043* (2013.01); *F16B 19/109* (2013.01); *F16B 19/1054* (2013.01); *Y10T 29/49956* (2015.01)

(58) Field of Classification Search
CPC ............... F16B 2/00; F16B 5/04; F16B 13/04; F16B 13/061; F16B 13/063; F16B 19/04; F16B 19/08; F16B 19/109; F16B 19/1027; F16B 19/1054; F16B 2001/0092; F16B 2019/1009; B21J 15/043

(Continued)

(56) References Cited

U.S. PATENT DOCUMENTS 2,030,165 A    2/1936    Huck
3,515,419 A *   6/1970    Baugh ................. F16B 19/1027
                                                     403/408.1

(Continued)

FOREIGN PATENT DOCUMENTS

EP         0497455 A1    8/1992
EP         0691479 A1    6/1995

(Continued)

OTHER PUBLICATIONS

International Search Report and Written Opinion of the International Searching Authority for International Patent Application No. PCT/US2014/030200 mailed on Jul. 16, 2014.

*Primary Examiner* — Roberta Delisle
(74) *Attorney, Agent, or Firm* — Burris Law, PLLC (57) ABSTRACT

A tacking fastener for securing workpieces together to form a temporary assembly is provided that includes a stem and a sleeve. The stem includes a proximal end portion, a central portion, and a distal end portion. The stem further includes a head disposed at the proximal end portion, the head defining a distal face having a gripping feature. The sleeve includes a flange disposed at the distal end portion, the flange defining a proximal face having a gripping feature. The sleeve is disposed around the stem and configured to form a tacking rivet upon installation of the tacking fastener. The sleeve is plastically deformed during installation to form a plurality of bulbs, thereby being capable of securing (Continued)

workpieces of varying grip length. The stem and the tacking rivet remain within the workpieces after the workpieces are secured.

20 Claims, 9 Drawing Sheets

Related U.S. Application Data (60) Provisional application No. 61/794,876, filed on Mar. 15, 2013.

(58) Field of Classification Search
USPC .......................... 411/13, 32, 37, 43, 51, 501
See application file for complete search history.

(56) References Cited

U.S. PATENT DOCUMENTS

| | | | | |
|---|---|---|---|---|
| 4,074,608 A * | 2/1978 | Siebol | ................ | F16B 19/1054 411/43 |
| 4,285,265 A | 8/1981 | Rieper | | |
| 4,639,175 A * | 1/1987 | Wollar | ................ | F16B 19/008 411/38 |
| 4,642,010 A | 2/1987 | Bradley et al. | | |
| 4,958,971 A * | 9/1990 | Lacey | ................ | F16B 19/1054 411/38 |
| 5,503,510 A * | 4/1996 | Golan | ................ | F16B 19/1054 411/43 |
| 5,551,816 A * | 9/1996 | Brewer | .................. | B21J 15/50 29/426.4 |
| 5,645,383 A * | 7/1997 | Williams | ............ | F16B 19/1054 411/38 |
| 6,004,086 A * | 12/1999 | Gand | .................. | F16B 19/1054 411/33 |
| 6,095,739 A * | 8/2000 | Albertson | ............ | F16B 1/0071 411/13 |
| 6,186,717 B1 | 2/2001 | Cosenza | | |
| 6,270,302 B1 * | 8/2001 | Lyons | ...................... | B60B 3/16 411/121 |
| 6,406,237 B1 | 6/2002 | Wojciechowski et al. | | |
| 6,499,926 B2 | 12/2002 | Keener | | |
| 6,746,192 B2 | 6/2004 | Eshraghi | | |
| 7,021,878 B1 * | 4/2006 | Albertson | ................ | B27F 7/00 403/27 |
| 7,303,366 B2 * | 12/2007 | Smith | .................. | F16B 19/1072 411/34 |
| 7,396,287 B2 * | 7/2008 | Jennings | ............ | F16B 19/1054 470/28 |
| 8,491,243 B2 * | 7/2013 | Smith | ................ | F16B 19/1054 411/38 |
| 2002/0085895 A1 * | 7/2002 | Dehlke | ............... | F16B 19/1054 411/43 |
| 2003/0082025 A1 | 5/2003 | Luhm | | |
| 2003/0123949 A1 | 7/2003 | Eshraghi | | |
| 2005/0002760 A1 * | 1/2005 | Hayashi | ............ | F16B 19/1054 411/501 |
| 2005/0260056 A1 | 11/2005 | Denham | | |
| 2007/0147971 A1 * | 6/2007 | Jennings | ............ | F16B 19/1054 411/38 |
| 2010/0329811 A1 * | 12/2010 | Smith | ................ | F16B 19/1054 411/43 |

FOREIGN PATENT DOCUMENTS

| | | |
|---|---|---|
| EP | 1607639 A1 | 12/2005 |
| GB | 402813 | 12/1933 |

* cited by examiner

BLIND, BULBING, TACKING RIVET AND METHOD OF INSTALLATION

CROSS-REFERENCE TO RELATED APPLICATIONS

The present application is a continuation-in-part application of U.S. application Ser. No. 14/215,544, filed on Mar. 17, 2014 and titled "BLIND, BULBING, TACKING RIVET AND METHOD OF INSTALLATION," which claims priority to U.S. Provisional Application Ser. No. 61/794,876, filed on Mar. 15, 2013. The disclosures of the above applications are incorporated herein by reference in their entirety.

FIELD

The present disclosure relates to rivets, and more specifically to tacking rivets that temporarily fasten workpieces together.

BACKGROUND

The statements in this section merely provide background information related to the present disclosure and may not constitute prior art.

Tacking rivets are used to temporarily fasten adjacent workpieces together for positioning purposes. The tacking rivets are inserted into only some of the apertures of the workpieces to properly align all the apertures of the workpieces before permanent rivets are inserted to permanently fasten the workpieces. After the permanent rivets are inserted into the remaining apertures, the tacking rivets are removed, for example, by drilling through the tacking rivets. More permanent rivets are then inserted into the apertures previously occupied by the tacking rivets to further fasten the workpieces.

A typical tacking rivet engages the workpieces by radially expanding a body of the tacking rivet to result in an interference fit between the body of the tacking rivets and the aperture surfaces. This interference fit may damage the aperture surfaces, making it difficult to insert the permanent rivet later due to the altered size/geometry of the apertures. Moreover, it is also difficult to remove typical tacking rivets without damaging the aperture surfaces of the workpieces. Further, typical tacking rivets of a specific length may be suitable only for workpieces of a specific thickness. Therefore, different sizes of typical tacking rivets are kept on-hand for workpieces of different thicknesses, thereby increasing inventory costs.

SUMMARY

Further areas of applicability will become apparent from the description provided herein. It should be understood that the description and specific examples are intended for purposes of illustration only and are not intended to limit the scope of the present disclosure.

In one form, a tacking fastener is provided for securing at least two workpieces together to form a temporary assembly. The tacking fastener includes a stem and a sleeve. The stem defines a proximal end portion, a central portion, and a distal end portion. The stem includes a head disposed at the proximal end portion, a tapered portion extending between the proximal end portion and the central portion, a break notch extending around a circumference of the proximal end portion between the head and the tapered portion, a compression groove flanked by two ridges extending around a circumference of the proximal end portion between the head and the break notch, and a plurality of ridges and grooves disposed along the distal end portion. The head defines a distal end face having a gripping feature, which may be a plurality of splines, and a recess extending into a proximal end of the head. The sleeve is disposed around the stem between the head and the plurality of ridges and grooves. The sleeve is configured to form a tacking rivet upon installation of the tacking fastener. The sleeve defines a flange having a proximal face and a distal face. The proximal face defines a gripping feature, which in one form is a plurality of splines. The distal face, in one form, defines a diameter marking indicia. The sleeve is plastically deformed during installation to form a plurality of bulbs, thereby being capable of securing workpieces of varying grip length. The stem and the tacking rivet remain within the workpieces after the workpieces are secured together, and the splines of the sleeve and the stem engage the workpieces to inhibit movement of the sleeve upon subsequent removal.

Figure 7:
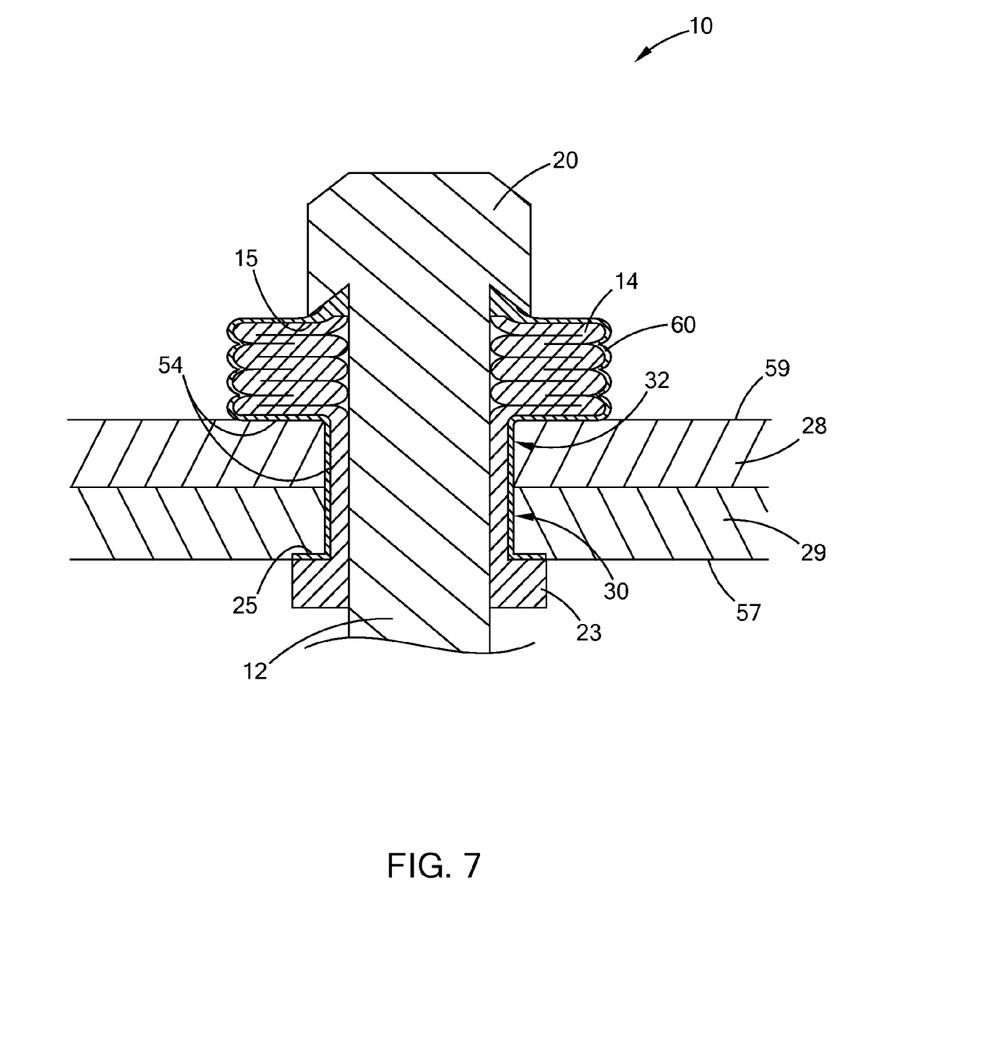
FIG. 7 is an enlarged cross-sectional view of the proximal end portion of a tacking fastener installed in accordance with the teachings of the present disclosure.

In another form, a structural assembly includes a tacking fastener, which comprises a stem and a sleeve. The stem defines a proximal end portion, a central portion, and a distal end portion. The stem includes a head disposed at the proximal end portion. The sleeve is disposed around the stem between the head and the plurality of ridges and grooves. The sleeve is configured to form a tacking rivet upon installation of the tacking fastener. Each surface of the tacking fastener gripping the workpiece defines gripping feature, which may be a plurality of splines, and the gripping features engage the workpiece to inhibit movement upon subsequent removal (as shown in FIG. 7).

In still another form, a method of installing a tacking fastener to secure at least two workpieces together is provided. The method includes inserting a stem and sleeve through aligned apertures of the workpieces, placing a flange of the sleeve against a distal surface of a first workpiece, pulling the stem distally away from the surface of the first workpieces such that a head of the stem plastically deforms the sleeve against a proximal surface of a second workpiece to form a tacking rivet having a plurality of bulbs along the sleeve. Each surface of the tacking rivet that engages the workpieces defines at least one gripping feature to positively engage the workpieces (as shown in FIG. 7).

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

Corresponding reference numerals indicate corresponding parts throughout the several views of the drawings.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
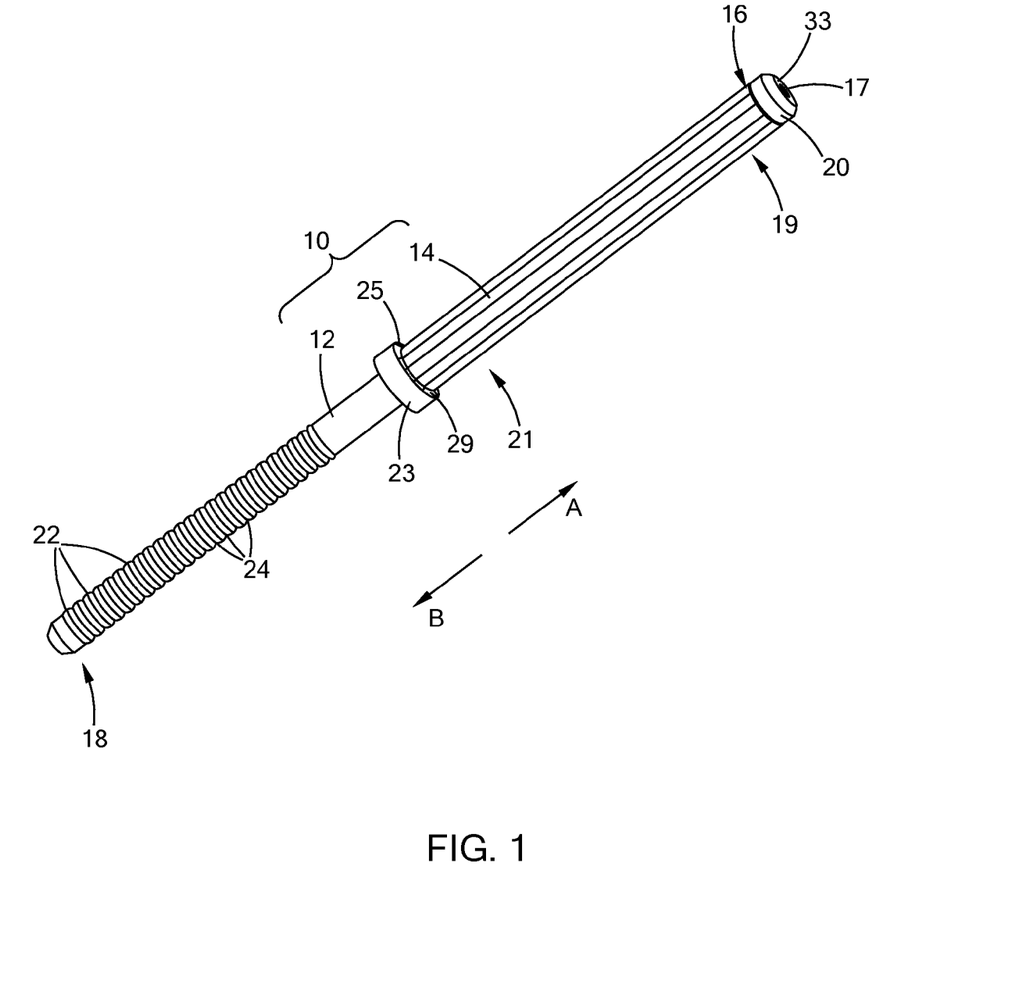
FIG. 1 is a perspective view of a tacking rivet assembly constructed in accordance with the teachings of the present disclosure.
Figure 2A:
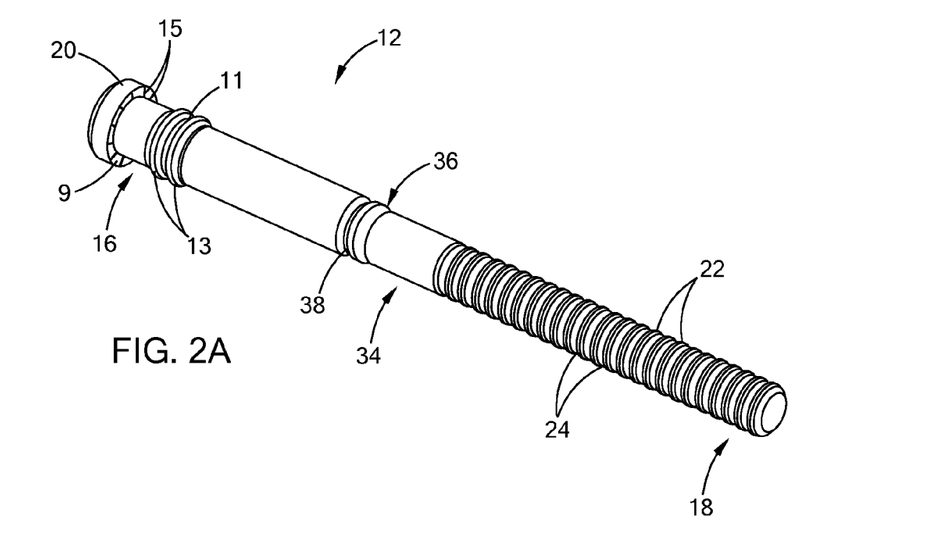
FIG. 2A is a perspective view of a stem of the tacking rivet assembly of FIG. 1.
Figure 2B:
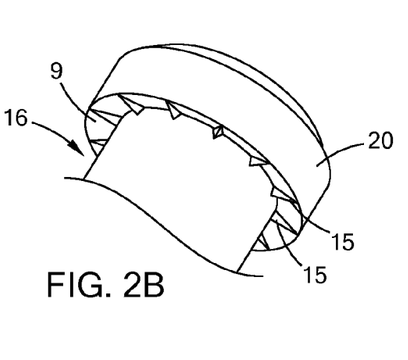
FIG. 2B is an enlarged partial perspective view of the head of the stem of the tacking rivet assembly of FIG. 1 illustrating gripping features in accordance with the teachings of the present disclosure.
Figure 2C:
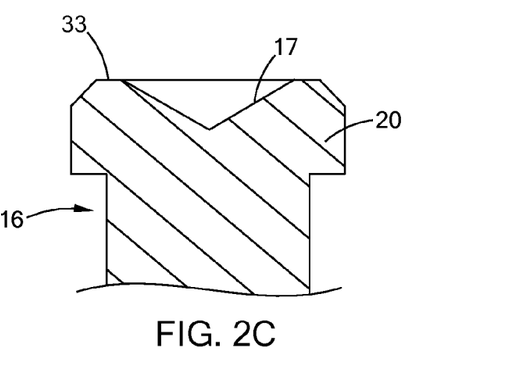
FIG. 2C is an enlarged partial cross-sectional view of the head of the stem of the tacking rivet assembly of FIG. 1 illustrating a drill guide constructed in accordance with the teachings of the present disclosure.
Figure 2D:
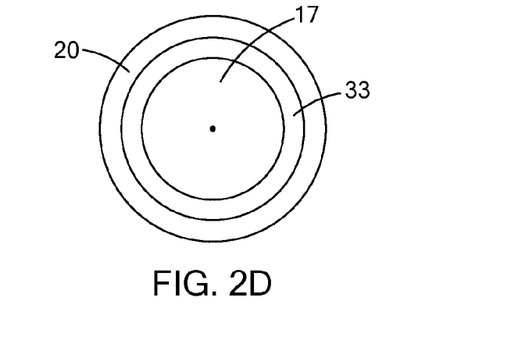
FIG. 2D is a plan view of the head of the stem of the tacking rivet assembly of FIG. 1, also illustrating the drill guide.

Referring to FIG. 1, a tacking rivet assembly 10 constructed in accordance with the teachings of the present disclosure is a two-piece structure and includes a stem 12 (also referred to as a mandrel) and a sleeve 14 disposed around the stem 12. Generally, the stem 12 is a tool used to plastically deform the sleeve 14 during installation to form a temporary rivet for fastening workpieces, which will be described in greater detail below.

The stem 12 includes a proximal end portion 16 and a distal end portion 18. The stem 12 includes a head 20 at the proximal end portion 16. In the present disclosure, "a proximal end," "a proximal end portion" or "a proximal surface" is used to indicate an end, portion or surface of a component that is located closer to the head 20 of the stem 12. Arrow A indicates a proximal direction, which is a direction parallel to the longitudinal axis of the tacking rivet assembly 10 and pointing toward the head 20 of the stem 12. "A distal end," "a distal end portion" or "a distal surface" is used to indicate an end, portion or surface of a component that is located away from the head 20 and thus is closer to the ridges 22 and grooves 24 of the stem 12. Arrow B indicates a distal direction, which is a direction parallel to the longitudinal axis of the tacking rivet assembly 10 and pointing away from the head 20.

The stem 12 further includes a plurality of ridges 22 and grooves 24 disposed along the distal end portion 18. The plurality of ridges 22 and grooves 24 are disposed along the distal end portion 18 to allow for gripping by a tool (not shown) during installation and removal. The sleeve 14 is disposed around the stem 12 and between the head 20 and the plurality of ridges 22 and grooves 24.

The sleeve 14 includes a proximal end portion 19 and a distal end 21 portion. An enlarged portion 23, which is a flange in this form of the present disclosure, is disposed at the distal end portion 19 of the sleeve 14. As shown, the proximal end portion 16 of the stem 12 and the head 20 protrude from the proximal end portion 19 of the sleeve 14.

Referring to FIGS. 2A through 2D, the distal face 9 of the head 20 of the stem 12 includes a gripping feature, to grip one of the workpieces as set forth in greater detail below. In one form, the gripping feature is a plurality of splines 15, and the splines 15 define an inverted "V" shape. Although the drawings indicate splines with an inverted "V" shape for the gripping feature, it should be understood that other forms of positive engagement, such as a knurling pattern or other geometric protrusion, may be employed while remaining within the scope of the present disclosure. In one form, the gripping features are designed to plastically deform when they engage the workpieces 26, 28, rather than the workpieces 26, 28 being plastically deformed.

The stem 12 further includes a central portion 34 disposed between the proximal end portion 16 and the distal end portion 18. The central portion 34 has an outside diameter smaller than the outside diameter of the proximal end portion 16. A tapered portion 36 is formed between the proximal end portion 16 and the central portion 34, which is shown in greater detail in FIG. 5.

Figure 4:
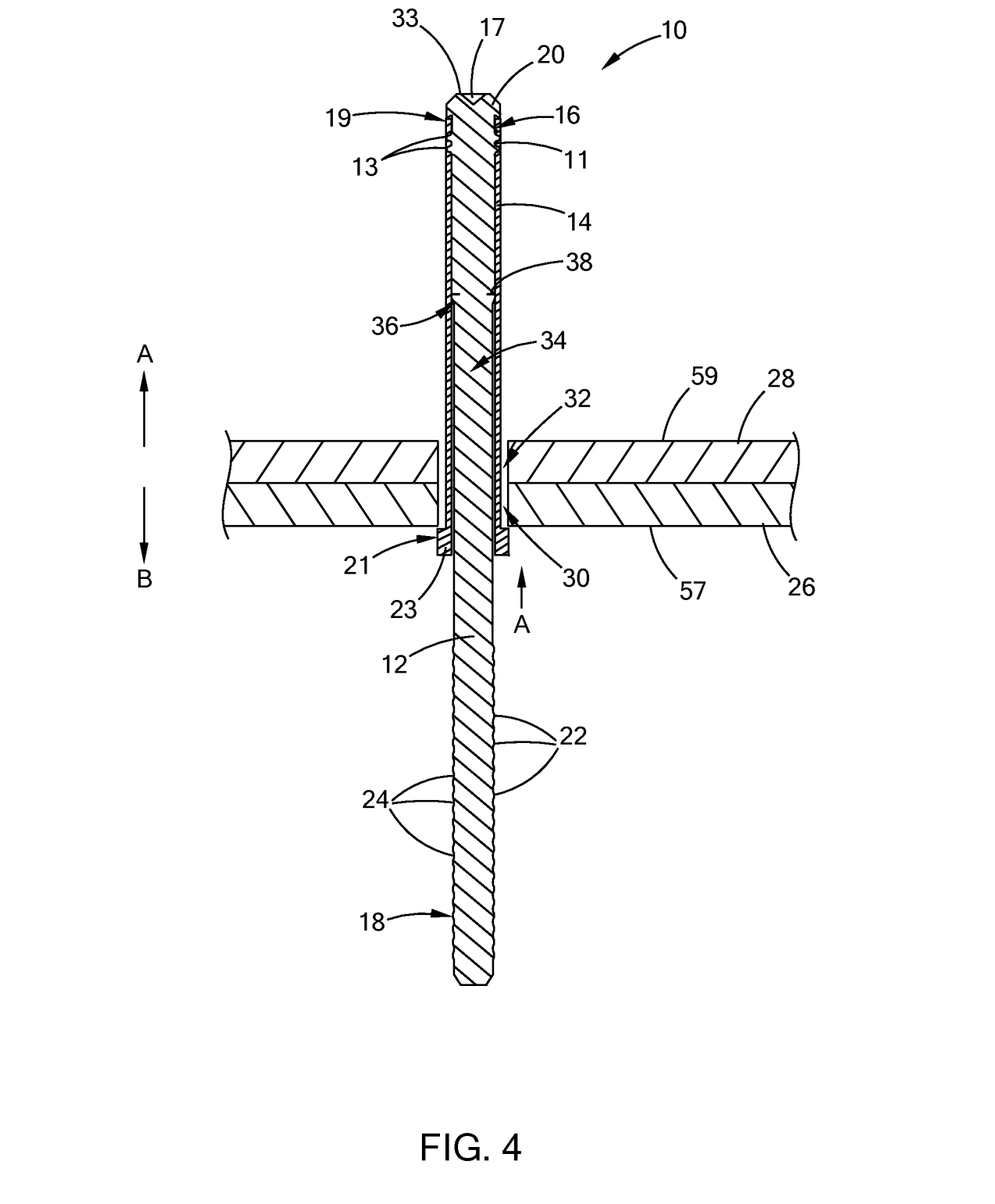
FIG. 4 is a cross-sectional view of a tacking rivet assembly inserted through workpieces to fasten the workpieces together.
Figure 5:
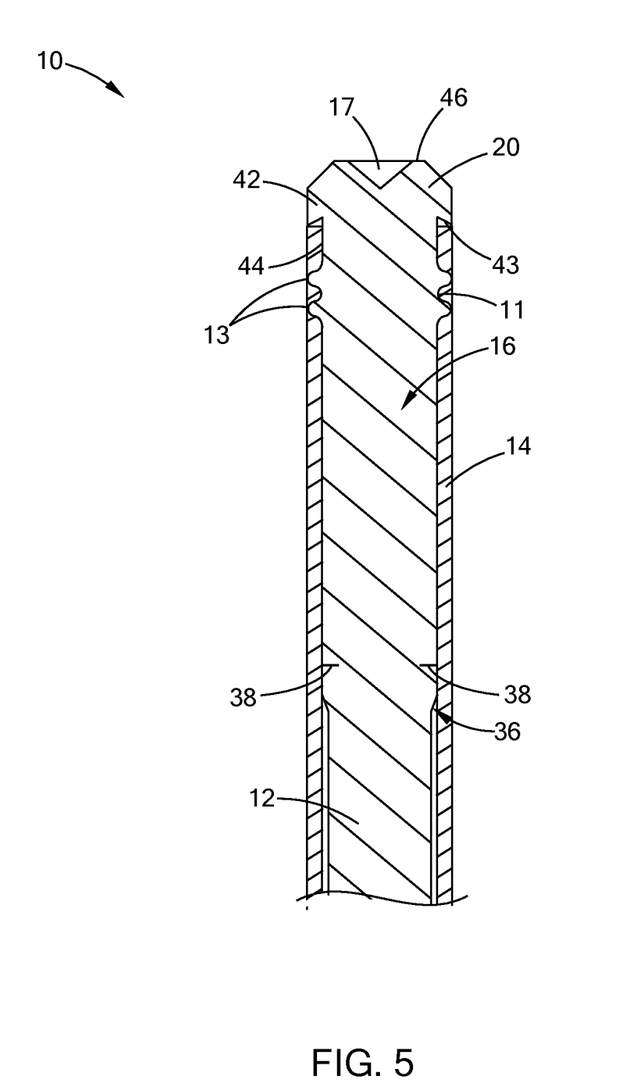
FIG. 5 is an enlarged view of a proximal end portion of a tacking rivet assembly constructed according to the principles of the present disclosure.

In one form, also shown in FIG. 5, the proximal end portion 16 defines a compression groove 11. The compression groove 11 may be flanked by two ridges 13 (also referred to as disassembly bulbs). The compression groove 11 and ridges 13 extend around a circumference of the proximal end portion 16 as shown. The compression groove 11 may be formed by a rolling process. The compression groove 11 functions to maintain axial compression on the sleeve 14 during installation of the tacking fastener 10, as shown in FIG. 4, and also described in greater detail below.

In another form, a break notch 38 extends around a circumference of the central portion 34, and in this form, is disposed between the compression groove 11 and the tapered portion 36. The break notch 38 facilitates breakaway of the stem 12 during installation, which is also described in greater detail below.

In one form, the head 20 defines a recess 17 (also referred to as a drill guide) at the center of, and recessed into, a proximal end face 33 of the head 20. Generally, the recess 17 is used as a guide for a drill when removing the tacking rivet assembly 10 after its temporary installation, which is described in greater detail below. Although the drawings indicate a conical shape for the recess 17, it should be understood that other shaped recesses may be employed while remaining within the scope of the present disclosure. For example, a square, cylindrical, or other polygonal shape may be employed in order to guide a drill or removal tool.

Figure 3A:
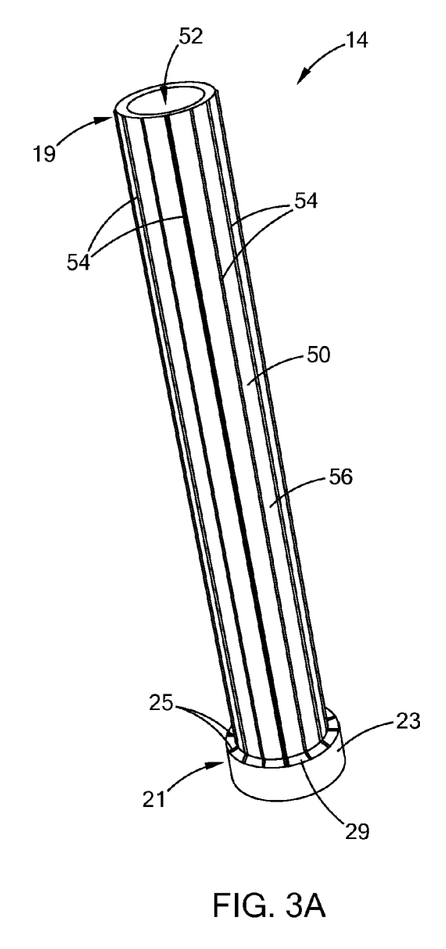
FIGS. 3A and 3B are perspective views of a sleeve of the tacking rivet assembly of FIG. 1.
Figure 3B:
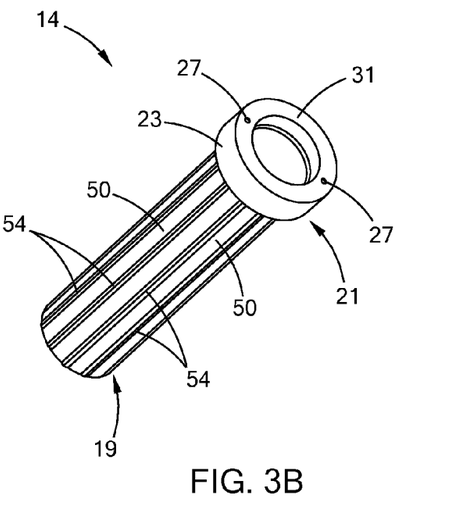
Figure 3C:
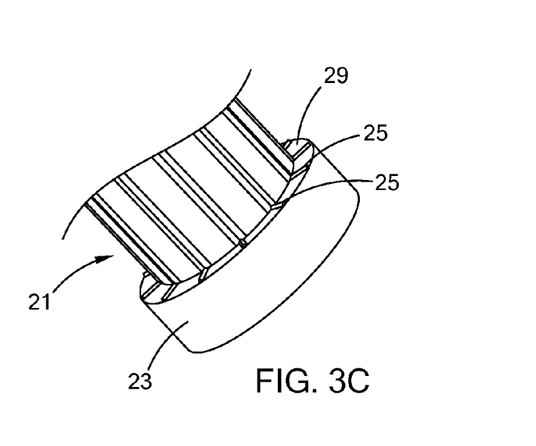
FIG. 3C is an enlarged partial perspective view of a distal end portion of the sleeve of the tacking rivet assembly of FIG. 1, illustrating gripping features constructed in accordance with the teaching of the present disclosure.

Referring to FIGS. 3A through 3C, the sleeve 14 defines a hollow body 50 defining an opening 52, through which the stem 12 is inserted. The flange 23 is disposed at the distal end 21 of the sleeve 14 and extends radially and outwardly from the hollow body 50 as shown. The flange 23 has an outside diameter greater than that of the hollow body 50. In one form, the proximal face 29 of the flange 23 defines a gripping feature, which may be a plurality of splines 25. In one form, the splines 25 have an inverted "V" shape as shown and are configured to positively engage a workpiece during installation and removal in order to inhibit movement, which is described in greater detail below. Although the drawings indicate splines with an inverted "V" shape for the gripping feature, it should be understood that other forms of positive engagement, such as a knurling pattern or other geometric protrusion, may be employed while remaining within the scope of the present disclosure.

In one form, the distal face 31 of the flange 23 defines a diameter marking indicia 27. The diameter marking indicia 27 may include one indentation for a #4 diameter, two indentations for a #5 diameter, and three indentations for a #6 diameter. Although the drawing indicates circular and equally spaced indentations for the diameter marking indicia 27, it should be understood that other indications of diameter size may be employed while remaining within the scope of the present disclosure. The diameter marking indicia 27 may also be completely omitted while remaining within the scope of the present disclosure.

As further shown, the sleeve 14 defines a plurality of axial ridges 54 on an outer surface 56 which function both to facilitate formation of the bulbs 60 and to grip the workpieces 26, 28. Therefore, each surface of the tacking fastener 10 that engages the workpieces defines at least one gripping feature to positively engage the workpieces. In other forms, the sleeve 14 or portions thereof may be red in color for machine recognition, or may include other markings or indicia as specific applications may dictate/require.

Referring to FIG. 4, the tacking rivet assembly 10 is configured to temporarily fasten two or more workpieces. FIG. 4 shows only two workpieces 26 and 28 for illustrative purposes and does not limit application of the tacking rivet assembly 10 to two workpieces. Accordingly, the tacking rivet assembly 10 may be employed with a single workpiece or more than two workpieces while remaining within the scope of the present disclosure.

To temporarily fasten the first and second workpieces 26 and 28, the sleeve 14 is first inserted into the apertures 30 and 32 of the first and second workpieces 26 and 28 along the proximal direction A from the side of the first workpiece 26 until the flange 23 abuts against a distal surface 57 of the first workpiece 26. Next, the stem 12 is inserted into the apertures 30 and 32 along the distal direction B from the side of the second workpiece 28. The distal end portion 18 and the central portion 34 of the stem 12 have an outside diameter smaller than that of the proximal end portion 16. Therefore, the stem 12 can be easily inserted through the sleeve 14 until when the head 20 contacts the proximal end 19 of the sleeve 14 or when a frictional contact between the proximal end portion 16 of the stem 12 and the sleeve 14 prevents further movement of the stem 12.

Alternatively, the apertures 30 and 32 may have a diameter that is greater than the outside diameter of the head 20. Therefore, the sleeve 14, together with the stem 12, may be inserted into the apertures 30 and 32 of the workpieces 26 and 28 as a unit from the side of the first workpiece 26. In this case, the sleeve 14 may be loosely disposed in the apertures 30 and 32 with a larger gap between the aperture surfaces and the sleeve 14. As will become clear in the following description, a secure connection between the sleeve 14 and the workpieces 26 and 28 does not depend on the contact between the sleeve 14 and the aperture surfaces that define the apertures 30 and 32. Therefore, the gap does not affect the secured connection between the sleeve 14 and the workpieces 26 and 28.

Referring to FIG. 5, the head 20 of the stem 12 in another form includes a flange 42 having a slant surface 43 that defines an acute angle 8 relative to a sidewall 44 of the proximal end portion 16. This slant surface 43 is another form of the gripping feature as set forth above. In one form, the head 20 has a chamfered upper surface 46 as shown to facilitate handling and installation.

Figure 6A:
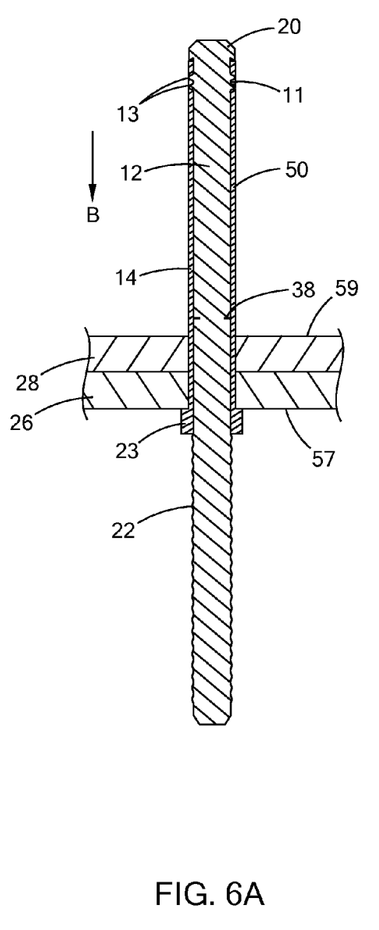
FIGS. 6A to 6F are cross-sectional views showing progressive installation of a tacking rivet assembly according to the principles of the present disclosure.
Figure 6B:
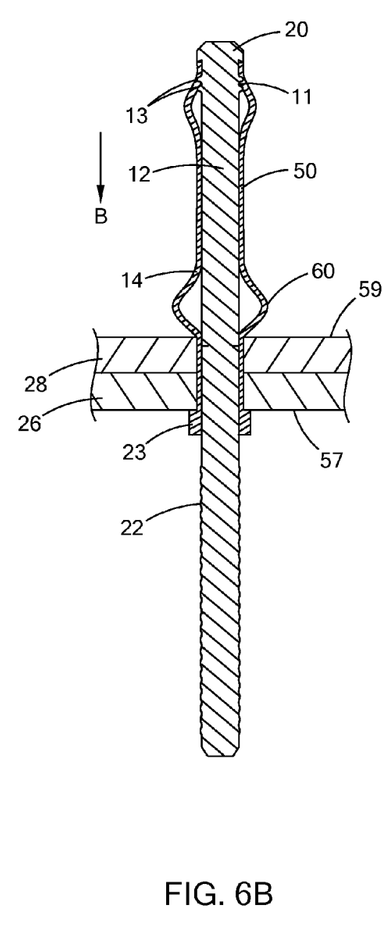

FIGS. 6A to 6B show the initial steps of installing the tacking rivet assembly 10 to the workpieces 26 and 28. FIG. 6A is similar to FIG. 4 where the head 20 does not contact the proximal end 19 of the sleeve 14, and the sleeve 14 remains in its original form. A significant portion of the hollow body 50 of the sleeve 14 is disposed outside and extends from the second workpiece 28. A fixture (not shown) is used to maintain the position of the flange 23 against the distal surface 57 of the first workpiece 26. A gripping tool (not shown) grips the ridges 22 and the grooves 24 (not shown in FIG. 6A) to pull the stem 12 along the distal direction B. In FIG. 6B, when the stem 12 is pulled in the distal direction B, the head 20 is moved in the distal direction B and starts to contact the proximal end 19 of the sleeve 14. The hollow body 50 of the sleeve 14 is constrained between the head 20 of the stem 12 and the flange 23 of the sleeve 14. As the stem 12 continues to be pulled, the head 20 compresses the hollow body 50 of the sleeve 14, causing buckling thereof. The compressive forces applied to the hollow body 50 of the sleeve 14 cause a portion of the hollow body 50 of the sleeve 14 to undergo plastic deformation and expand outwardly and laterally to form a bulb 60. The bulb 60 is likely to be formed first adjacent to the second workpiece 28 to engage the proximal surface 59 of the first workpiece 26. Another portion of the hollow body 50 of the sleeve 14 may also start to undergo plastic deformation and expands slightly as shown.

Figure 6C:
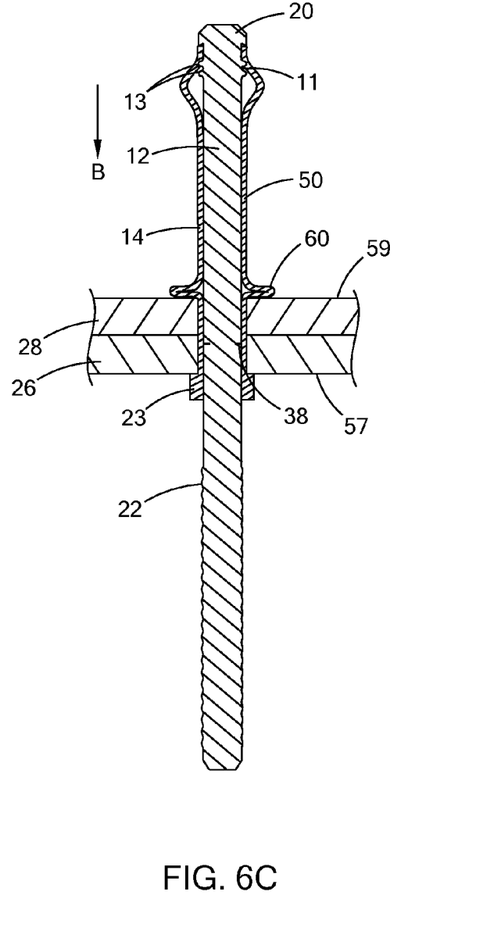
Figure 6D:
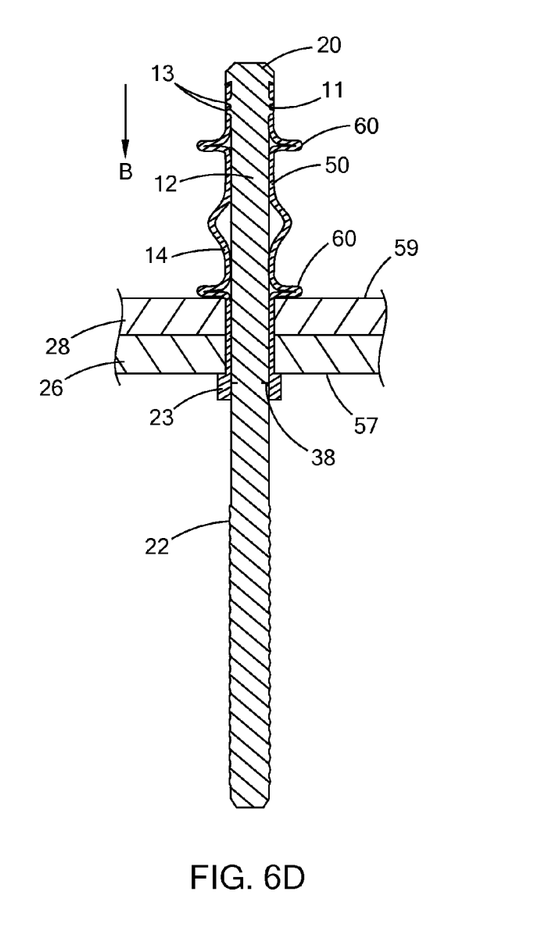
Figure 6E:
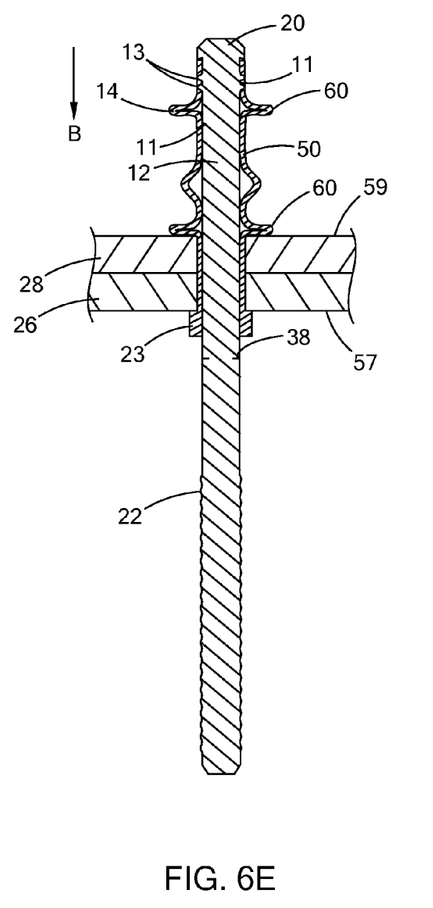

As shown in FIGS. 6C to 6E, as pulling of the stem 12 continues, the head 20 is moved further toward the workpieces 26 and 28 to cause further plastic deformation in more parts of the hollow body 50. More portions of the hollow body 50 expand outwardly and radially to form additional bulbs 60 as shown. The compression groove 11 helps to maintain axial compression of the sleeve 14 as the bulbs 60 are formed. The hollow body 50 may stop being deformed when the hollow body 50 reaches an effective length where buckling under the same compressive force can no longer occur or when all portions of the hollow body 50 of the sleeve 14 have undergone plastic deformation to form bulbs 60 and there is no available part at the hollow body 50 to form bulbs 60.

Figure 6F:
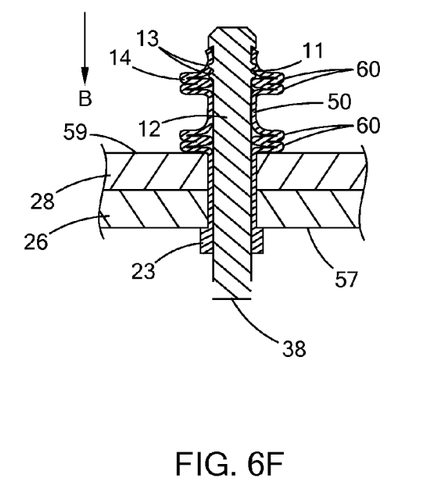

As shown in FIG. 6F, when the head 20 cannot be moved further down, the hollow body 50 of the sleeve 14 forms a number of bulbs 60 that expand outwardly and radially. After the stem 12 is inserted and pulled to push the tubular body 50 of the sleeve 14 to form the plurality of bulbs 60, the stem 12 remains in the sleeve 14 and eventually fractures at the break notch 38 as shown, resulting in a recessed stem break. The fixture (not shown) for fixing the flange 23 of the sleeve 14 is then removed. Therefore, the workpieces 26 and 28 are clamped between the bulbs 60 and the flanges 23.

The number of bulbs 60 formed during installation depends on the length of the hollow body 50 of the sleeve 14 that protrudes outside the second workpiece 28. Therefore, for a given length of the sleeve 14, the number of bulbs 60 that would be formed during installation also depends on the thicknesses of the workpieces 26 and 28. Therefore, the tacking rivet assembly 10 that has a particular length of the sleeve 14 can be used to fasten workpieces of varying thickness. Any number of bulbs 60, including one, can be formed to secure the sleeve 14 to the workpieces 26 and 28. The length of the hollow body 50 of the sleeve 14 that extends from the second workpiece 28 should have a sufficient length to allow for sufficient plastic deformation to form at least one bulb 60 against the proximal surface 59 of the second workpiece 28. The number of bulbs 60 may be five in one form of the present disclosure.

The axial ridges 54 on the outer surface 56 of the tubular body 50 of the sleeve 14 are designed to be plastically deformed to facilitate formation of bulbs 60. While the ridges 54 are shown to extend axially along the entire length of the hollow body 50, it is understood that the ridges 54 may extend only a portion of the length of the hollow body 50 without departing from the scope of the present disclosure. The length of the ridges 54 may depend on the thickness of the workpieces 26 and 28 and may be configured to provide varying grip length. The grip length varies between about 0.100" and about 0.850". Any number of the ridges 54 may be formed without departing from the scope of the present disclosure.

Referring to FIG. 7, in one form, each surface of the tacking fastener assembly 10 that is in contact with the workpieces positively engages the workpieces. More specifically, the axial ridges 54 of the sleeve 14 grip the proximal surface of the first workpiece 28 and the apertures 30 and 32 of the first and second workpiece 29. The gripping feature 25 of the flange 23 grips the distal surface 57 of the second workpiece. The gripping feature 15 of the head 20 of the stem 12 engages the sleeve 14. Accordingly, the gripping features inhibit spinning of the sleeve 14 upon subsequent removal and help to positively secure the tacking fastener assembly 10 to the workpieces 28, 29.

As previously described, the head 20 has a flange 42 defining a slant surface 43, which defines an acute angle 8 relative to the side wall 44 of the proximal end portion 16. The slant surface 43 helps maintain the contact between the proximal end 19 of the sleeve 14 and the head 20 during the pulling process of the stem 12 despite that the head 20 protrudes slightly and laterally from the sidewalls 44 of the stem 12.

To remove the temporary rivet formed by the plastically deformed sleeve 14 and the stem 12 from the workpieces 26 and 28, the head 20 of the stem 12 may be drilled through at the drill guide 17 such that the stem 12 may be removed from the assembly first. The gripping features on the head 20 and the flange 23 positively engage the workpieces to prevent rotation of the tacking rivet as it is removed from the workpieces 26 and 28. After the stem 12 is removed, the sleeve 14 can then be removed.

The tacking rivet assembly 10 of the present disclosure has the advantage of easy installation and removal without damaging the workpiece aperture surfaces. The workpieces 26 and 28 are fastened by clamping the workpieces 26 and 28 between the plastically deformed bulbs 60 and the flange 23 of the deformed sleeve 14. The bulbs 60 are disposed against the proximal surface 59 of the second workpiece 28. The flange 23 is disposed against the distal surface 57 of the first workpiece 26. No or only light expansion of the sleeve 14 occurs inside the apertures 30 and 32. Therefore, the removal of the tacking rivet assembly 10 would not damage the aperture surfaces to adversely affect the later installation of permanent rivets.

Moreover, with the tacking rivet assembly 10 of the present disclosure, the workpieces are fastened by clamping, rather than frictional engagement between the sleeve 14 and the aperture surfaces. The assembly tolerance between the tacking rivet assembly 10 and aperture surfaces becomes less important, thereby reducing manufacturing costs. Further, since the fastening of the tacking rivet assembly 10 to the workpieces is not achieved by an interference fit, the apertures 30 and 32 and the sleeve 14 do not have to have the same shape. For example, the apertures 30 and 32 may have a circular shape, whereas the hollow body 50 of the sleeve 14 may have a cross-sectional defining a shape other than a circular shape, such as triangular, among others.

Furthermore, with the tacking rivet assembly 10 of the present disclosure, the sleeve 14 is plastically deformed to form a number of bulbs 60 to clamp the workpieces, and the length of the sleeve 14 is reduced after plastic deformation. The required length of the sleeve 14 does not highly depend on the thickness of the workpieces to be clamped. Therefore, the tacking rivet assembly 10 of a particular length can be used to fasten workpieces of varying thicknesses.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A tacking fastener for securing at least two workpieces together to form a temporary assembly, the tacking fastener comprising:
   a stem defining a proximal end portion, a central portion, and a distal end portion, the stem comprising:
      a head disposed at the proximal end portion, the head defining a distal end face having a gripping feature, and a recess extending into a proximal end of the head;
      a tapered portion extending proximate the central portion;
      a break notch extending around a circumference of the stem between the head and the tapered portion;
      a compression groove extending around the circumference of the stem between the head and the break notch;
      a plurality of ridges and grooves disposed along the distal end portion; and
   a sleeve disposed around the stem between the head and the plurality of ridges and grooves, the sleeve configured to form a tacking rivet upon installation of the tacking fastener, the sleeve defining a flange having a proximal face and a distal face, the proximal face defining a gripping feature and the distal face defining a diameter marking indicia,
wherein the sleeve is plastically deformed during installation to form a plurality of bulbs, thereby being capable of securing workpieces of varying grip length, the stem and the tacking rivet remain within the workpieces after the workpieces are secured together, and the gripping feature of the sleeve and the stem engage the workpieces to inhibit spinning of the sleeve upon subsequent removal.

2. The tacking fastener according to claim 1, wherein the gripping feature is a plurality of splines.

3. The tacking fastener according to claim 2, wherein the plurality of splines define an inverted "V" shape.

4. The tacking fastener according to claim 1, wherein the head recess defines a conical shape.

5. The tacking fastener according to claim 1, wherein the compression groove is flanked by two ridges.

6. The tacking fastener according to claim 1, wherein the compression groove is formed by a rolling process.

7. The tacking fastener according to claim 1, wherein an outer surface of the sleeve defines a circular shape.

8. The tacking fastener according to claim 1, wherein the diameter marking indicia on the sleeve defines at least one indentation.

9. The tacking fastener according to claim 8, wherein the indentation is circular.

10. The tacking fastener according to claim 8, wherein the diameter marking indicia includes one indentation for a #4 diameter, two indentations for a #5 diameter, and three indentations for a #6 diameter.

11. The tacking fastener according to claim 10, wherein the indentations for the #5 and #6 diameters are equally spaced.

12. A structural assembly comprising the tacking fastener according to claim 1, and at least two workpieces, wherein the tacking fastener secures the at least two workpieces together.

13. A structural assembly comprising:
    at least two workpieces;
    a tacking fastener securing the two workpieces together, the tacking fastener comprising:
        a stem defining a proximal end portion, a central portion, and a distal end portion, the stem comprising a head disposed at the proximal end portion; and
        a sleeve disposed around the stem between the head and the plurality of ridges and grooves, the sleeve configured to form a tacking rivet upon installation of the tacking fastener,
wherein each surface of the tacking fastener that engages the workpieces defines at least one gripping feature to positively engage the workpieces and the sleeve is plastically deformed during installation to form a plurality of bulbs, thereby being capable of securing workpieces of varying grip length.

14. The structural assembly according to claim 13, wherein the gripping feature of the tacking fastener comprises a plurality of splines that are located on a distal end face of the head of the stem.

15. The structural assembly according to claim 13, wherein the griping feature of the tacking fastener comprises a plurality of splines that are located on a proximal end face of a flange of the sleeve.

16. A method of installing a tacking fastener to secure at least two workpieces together, the method comprising:
    inserting a stem and a sleeve through aligned apertures of the workpieces;
    placing a flange of the sleeve against a distal surface of a first workpiece;
    pulling the stem distally away from the distal surface of the first workpiece such that a head of the stem plastically deforms the sleeve against a proximal surface of a second workpiece to form a tacking rivet having a plurality of bulbs along the sleeve,
wherein each surface of the tacking fastener that engages the workpieces defines at least one gripping feature to positively engage the workpieces.

17. The method according to claim 16, wherein the sleeve is plastically deformed during installation to form a plurality of bulbs, thereby being capable of securing workpieces of varying grip length, and the stem and the tacking rivet remain within the workpieces after the workpieces are secured together.

18. The method according to claim 16, wherein the stem comprises a head that defines a recess extending into its proximal end, the recess being a drill guide for removal of the tacking fastener.

19. The method according to claim 16, wherein the stem comprises a compression groove extending around the circumference of the stem to maintain axial compression on the sleeve during installation.

20. The method according to claim 16, wherein the stem defines a break notch extending around a circumference thereof that facilitates break-away of the stem during installation for a recessed stem break.

\* \* \* \* \*